United States Patent [19]

Lin

[11] Patent Number: 5,461,221
[45] Date of Patent: Oct. 24, 1995

[54] CODEABLE CARD FOR CARD READER

[75] Inventor: Jui-Chang Lin, Kaohsiung Hsien, Taiwan

[73] Assignee: Taiwan Fu Hsing Industrial Co., Ltd., Kaohsiung Hsien, Taiwan

[21] Appl. No.: 302,489

[22] Filed: Sep. 12, 1994

[51] Int. Cl.$^6$ ................................................ G06K 21/00
[52] U.S. Cl. ........................ 235/488; 235/489; 235/494
[58] Field of Search ................................. 235/488, 489, 235/494

[56] References Cited

U.S. PATENT DOCUMENTS 4,092,526  5/1978  Back ........................................ 235/487
4,837,427  6/1989  Lin .......................................... 235/488

Primary Examiner—Harold Pitts
Attorney, Agent, or Firm—Jacobson, Price, Holman & Stern

[57] ABSTRACT

A codeable card includes a coding area formed on one side of a card body and having a number of opaque elements to be removed for coding number. A cover layer has portion secured to the card body and has the other portion secured to the coding area before the opaque elements are removed. The other portion of the cover layer is protected with a removable layer which is removed before the other portion of the cover layer is secured to the card body. The users may easily code the required number be removing the opaque elements.

2 Claims, 1 Drawing Sheet

CODEABLE CARD FOR CARD READER

BACKGROUND OF THE INVENTION

1. Field of the Invention

The present invention relates to a card, and more particularly to a codeable card for card reader.

2. Description of the Prior Art

The closest prior art of which applicant is aware is his prior U.S. Pat. No. 4,837,427 to Lin, filed Jul. 24, 1987. In this patent, a sheet material is printed with opaque ink except a plurality of circles; and another sheet of paper has transposable opaque circles corresponding to that on the sheet material.

The present invention has arisen to provide a novel card which is much easier to be manufactured.

SUMMARY OF THE INVENTION

The primary objective of the present invention is to provide a card which can be easily manufactured.

In accordance with one aspect of the invention, there is provided a codeable card for card reader comprising a card body including a first side having at least one coding area formed therein, a plurality of opaque elements provided in the coding area, a cover layer including a first portion secured to the first side of the card body other than the coding area, and including a second portion, at least one of the opaque elements being removed in order to code number, the second portion of the cover layer being secured to the coding area after the opaque element is removed.

The second portion of the cover layer is further protected with a removable layer, the removable layer is removed before the second portion of the cover layer is secured to the card body.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
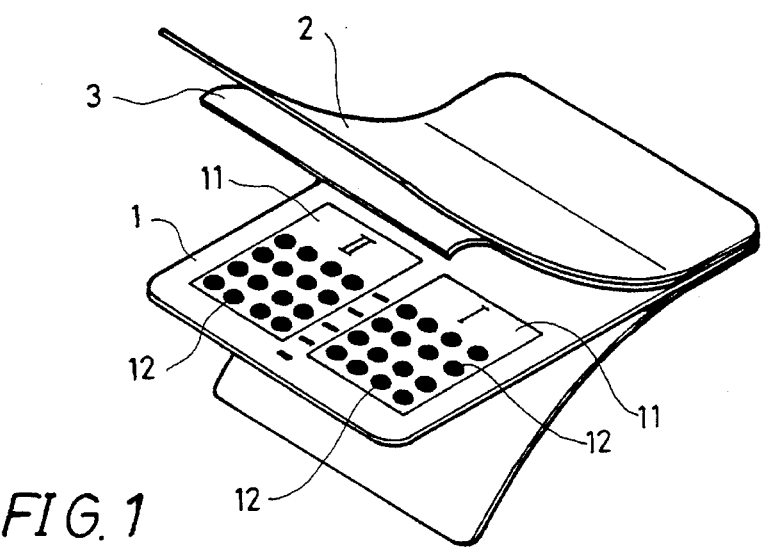
FIG. 1 is a perspective view of a codeable card in accordance with the present invention.
Figure 2:
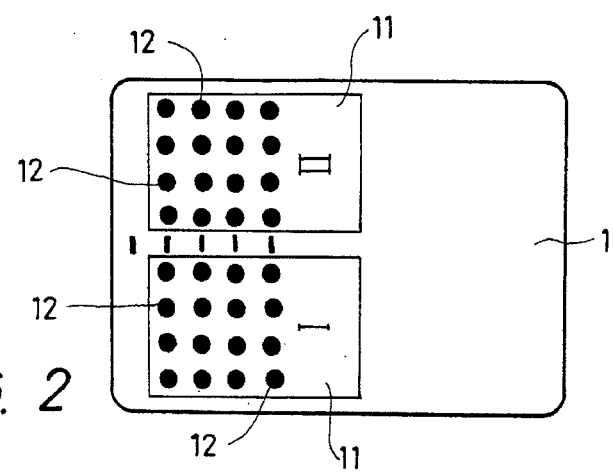
FIGS. 2 and 3 are plane views illustrating the application of the codeable card.

Referring to the drawings, and initially to FIGS. 1 and 2, a codeable card in accordance with the present invention comprises a card body 1 made of transparent materials like plastic, metal or paper. At least one coding area 11 is provided on the upper side of the card body 1 and includes a plurality of opaque elements 12 provided thereon, for example, the opaque elements 12 may be formed as black inked circles or may be formed by round opaque stickers, in which the opaque elements 12 may be scraped or removed when required. A cover layer 2 has a portion adhered to the upper surface of the card body 1 other than the coding area 11, the other portion of the cover layer 2 is coated with a coating layer, such as one kind of glue material, or protected with a removable sheet 3, such as a peeling-off oiled sheet.

Figure 3:
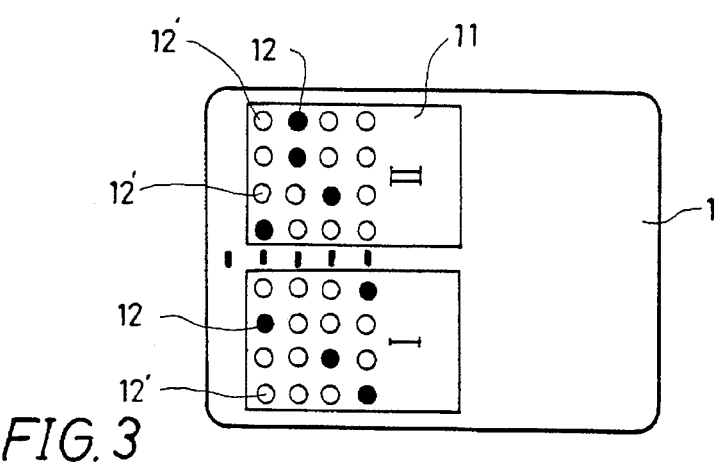

When the card is required to be manually coded with suitable coding number, as shown in FIG. 3, some of the opaque elements 12 are removed or scraped in order to form the transparent circles 12' and in order to form the required coding number. After the opaque elements 12 are removed or scraped, the removable sheet 3 is removed from the cover layer 2 which is then adhered to the upper side of the card body 1 in order to protect the opaque elements 12 that remained on the card body 1 and in order to protect the opaque elements 12 from being removed or scraped.

Accordingly, the codeable card in accordance with the present invention includes a configuration that is much easier to be manufactured, and the users may easily code the required number.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A codeable card for card reader comprising:

a card body including a first side having at least one coding area formed therein, a plurality of opaque elements provided in said coding area, a cover layer including a first portion secured to said first side of said card body other than said coding area, and including a second portion, at least one of said opaque elements being removed in order to code number, said second portion of said cover layer being secured to said coding area after said opaque element is removed.

2. A codeable card according to claim 1, wherein said second portion of said cover layer is further protected with a removable layer, said removable layer is removed before said second portion of said cover layer is secured to said card body.

\* \* \* \* \*